United States Patent
Toyohara et al.

[11] Patent Number: 5,921,226
[45] Date of Patent: Jul. 13, 1999

[54] APPARATUS FOR CONTROLLING THE FUEL INJECTION QUANTITY

[75] Inventors: Masahiro Toyohara; Takeshi Atago; Toshio Hori; Kimio Hoshi, all of Hitachinaka, Japan

[73] Assignees: Hitachi, Ltd.; Hitachi Automotive Engineering, both of Tokyo, Japan

[21] Appl. No.: 08/880,444

[22] Filed: Jun. 24, 1997

Related U.S. Application Data

[63] Continuation of application No. 08/393,492, Feb. 24, 1995., abandoned

[30] Foreign Application Priority Data

Feb. 24, 1994 [JP] Japan .................................. 6-026925

[51] Int. Cl.⁶ ......................................................... F02D 41/14
[52] U.S. Cl. ............................................................. 123/674
[58] Field of Search ...................................... 123/674, 675

[56] References Cited

U.S. PATENT DOCUMENTS

| | | | |
|---|---|---|---|
| 4,759,332 | 7/1988 | Morozumi | 123/685 |
| 5,048,493 | 9/1991 | Orzel et al. | 123/674 |

FOREIGN PATENT DOCUMENTS

2-70953  3/1990  Japan .

*Primary Examiner*—Andrew M. Dollnar
*Attorney, Agent, or Firm*—Antonelli, Terry, Stout & Kraus, LLP

[57] ABSTRACT

Disclosed is an apparatus for controlling the fuel injection quantity for an internal combustion engine. The apparatus includes an operating condition detecting unit for detecting the operating conditions of an internal combustion engine on the basis of the engine speed and the intake air amount or the internal pressure of an intake pipe, a purge control variable calculating unit for calculating the amount of the purge control on the basis of the detected operating conditions, an A/F ratio learning and calculating unit for learning the deviation from the desired A/F ratio control by inputting the effect of the disturbance due to the canister purge and performing the A/F ratio feedback control, a memory unit for storing the deviation learned by the calculating unit, and a fuel injection quantity calculation means unit for determining the fuel injection quantity by the amount of correction based on the result of the learned deviation and the A/F ratio deviation obtained by the A/F ratio control.

6 Claims, 10 Drawing Sheets

APPARATUS FOR CONTROLLING THE FUEL INJECTION QUANTITY

This application is a continuation of application Ser. No. 08/393,492 filed on Feb. 24, 1995, now abandoned.

BACKGROUND OF THE INVENTION

1. Field of the Invention

The present invention relates to an apparatus for controlling the fuel injection quantity, in which an air/fuel (A/F) ratio feedback control and an A/F ratio open control can be switched.

2. Description of the Prior Art

Generally, a feedback control is performed in an internal combustion engine, in which a basic fuel injection quantity is computed on the basis of the intake air amount or the internal pressure of an intake pipe and the engine speed, and is corrected on the basis of the output of an $O_2$ sensor installed in an exhaust pipe of the internal combustion engine. As a result, the fuel to be supplied into the engine can be adjusted to satisfy the desired A/F ratio such as the theoretical A/F ratio. For example, when the disturbance of the A/F ratio control such as the canister purge occurs, the coefficient (hereinafter, referred to as an $\alpha$ signal) which corrects the fuel injection quantity so as to obtain the theoretical A/F ratio, is computed in a control unit. The desired A/F ratio can be obtained by the A/F ratio feedback control in which the calculated coefficient value is used. Accordingly, when the canister purge is larger than the theoretical A/F ratio, the $\alpha$ signal is outputted in order to decrease the fuel injection quantity more than the case where the canister purge is not performed.

There is shown the prior countermeasure to the disturbance of the A/F ratio control in the laid-open patent application 2-70953 (1990), in which disclosed is such a technique that calculates the deviation from the standard value of the $\alpha$ signal, corrects it every operation regions so that the $\alpha$ signal may be stabilized at the standard value, and learns them. Therefore, even if the disturbance of the A/F ratio occurs, it is possible to control accurately the A/F ratio and supply stably the fuel injection, independent of the disturbance of A/F ratio control and the operation region, by detecting, correcting and learning the disturbance of A/F ratio in the control unit.

However, accurate control can be achieved only within the region of A/F ratio feedback control in which the oxygen sensor is activated. Therefore, during A/F ratio open control such as an A/F ratio lean burn control, the accuracy of A/F ratio control may be remarkably decreased due to the effect of A/F ratio control disturbance such as the canister purge.

Generally, the A/F ratio of the internal combustion engine is adjusted to the theoretical A/F ratio by the A/F ratio feedback control. Then, the condition for shifting to the A/F ratio open control is satisfied and the open control is performed. After shifting to the open control, the control must be performed independent of the value learned so far, because of the disturbance of canister purge. That is, the A/F ratio may be gradually varied, because the concentration of the gas vapor in the purge air from the canister, which is supplied to the internal combustion engine along with the intake air during the open control, may be changed over time. When the gas concentration of canister purge is decreased, the A/F ratio becomes lean, thus the driving performance may be deteriorated due to misfire, torque-down, and so on. On the other hand, when the gas concentration of canister purge is increased, the A/F ratio becomes rich, thus the components of exhaust gas may be deteriorated.

As described above, the learning correction amount in the A/F ratio feedback control can not be renewed in the A/F ratio open control. Therefore, there is such a problem that when the disturbance of the A/F ratio control is changed over time during the A/F ratio open control, the accurate correction can not made, the driving performance may be deteriorated, and the components of exhaust gas may also get worse.

Now, the gas concentration during the purge may be effected by various factors such as the temperature, the amount of gas and the gas characteristics. Therefore, it is very difficult to predict the gas concentration. As a result, when shifting to the A/F ratio open control, it is essential to recognize quickly and accurately and correct suitably the effect of the disturbance of A/F ratio. Furthermore, it is also essential to adjust the fuel injection quantity in accordance with the time varying amount of the disturbance of A/F ratio during the open control.

SUMMARY OF THE INVENTION

The present invention is made on the basis of the point of view that the change in the A/F ratio due to the effect of purge can be known only during the A/F ratio feedback control. According to the present invention, the effect of purge can be detected during the A/F ratio feedback control, and the fuel injection quantity to be supplied during the open control can be controlled on the basis of the magnitude of the detected effect.

It is an object of the present invention to provide an apparatus for controlling the fuel injection quantity which can correct the disturbance of A/F ratio control during the A/F ratio open control.

It is a further object of the present invention to provide an apparatus for controlling the fuel injection quantity which can increase the accuracy of A/F ratio control.

It is another object of the present invention to provide an apparatus for controlling the fuel injection quantity which can maintain the good driving performance, and which can prevent the exhaust gas from deteriorating, that is, which is capable of more effectively lowering emission levels.

The foregoing objectives are achieved in an apparatus for controlling the fuel injection quantity which comprises operating condition detecting means for detecting the operating condition of an internal combustion engine on the basis of the engine speed and the intake air amount or the internal pressure of an intake pipe, purge control variable calculating means for calculating the amount of purge control on the basis of the detected operating conditions, A/F ratio learning and calculating means for learning the deviation from the desired A/F ratio control by inputting the effect of disturbance due to the canister purge and performing the A/F ratio feedback control, memory means for storing the deviation learned by the calculating means, and fuel injection quantity calculation means for determining the fuel injection quantity by the amount of correction based on the result of the learned deviation and the A/F ratio deviation obtained by the A/F ratio control.

More concretely, an apparatus for controlling the fuel injection quantity is comprised of means for detecting the A/F ratio by using an oxygen sensor, means for detecting the intaked air amount or the internal pressure of an intake pipe in an internal combustion engine, means for detecting the deviation from the desired A/F ratio by using the output of the oxygen sensor, means for detecting the operating conditions of the engine on the basis of the engine speed and the intake air amount or the internal pressure of the intake pipe, means for determining the fuel injection quantity on the basis of the operating conditions detected by the detecting means, means for determining the amount of canister purge from the operating conditions, means for learning the deviation from the desired value for the A/F ratio, means for dividing the learned deviation amount at the predetermined ratio in accordance with the operating conditions and for learning each of them as different factors, means for determining the A/F ratio control due to the canister purge in each of the operating region, and means for correcting the fuel injection quantity on the basis of the learned deviation amount and the A/F ratio deviation amount obtained from the output of the oxygen sensor.

In the apparatus for controlling the fuel injection quantity constructed as the above, the effect of the disturbance of A/F ratio control can be obtained by detecting the control amount of the disturbance and the deviation amount from the desired A/F ratio during the A/F ratio feedback control. The fuel injection quantity can be corrected according to the operating conditions by using the A/F ratio open control, on the basis of the learned deviation amount and the A/F ratio deviation amount obtained from the output of the oxygen sensor. When the disturbance may change over time during the open control, it is possible to maintain the good and long operation performance by learning again the magnitude of its effect after the predetermined time elapsed.

These and other objects, features and advantages of the present invention will become more apparent from the detailed description of the preferred embodiments taken in conjunction with the accompanying drawings.

DETAILED DESCRIPTION OF THE PREFERRED EMBODIMENTS

The preferred embodiments of the present invention will be explained hereinafter with reference to the accompanying drawings.

Figure 1:
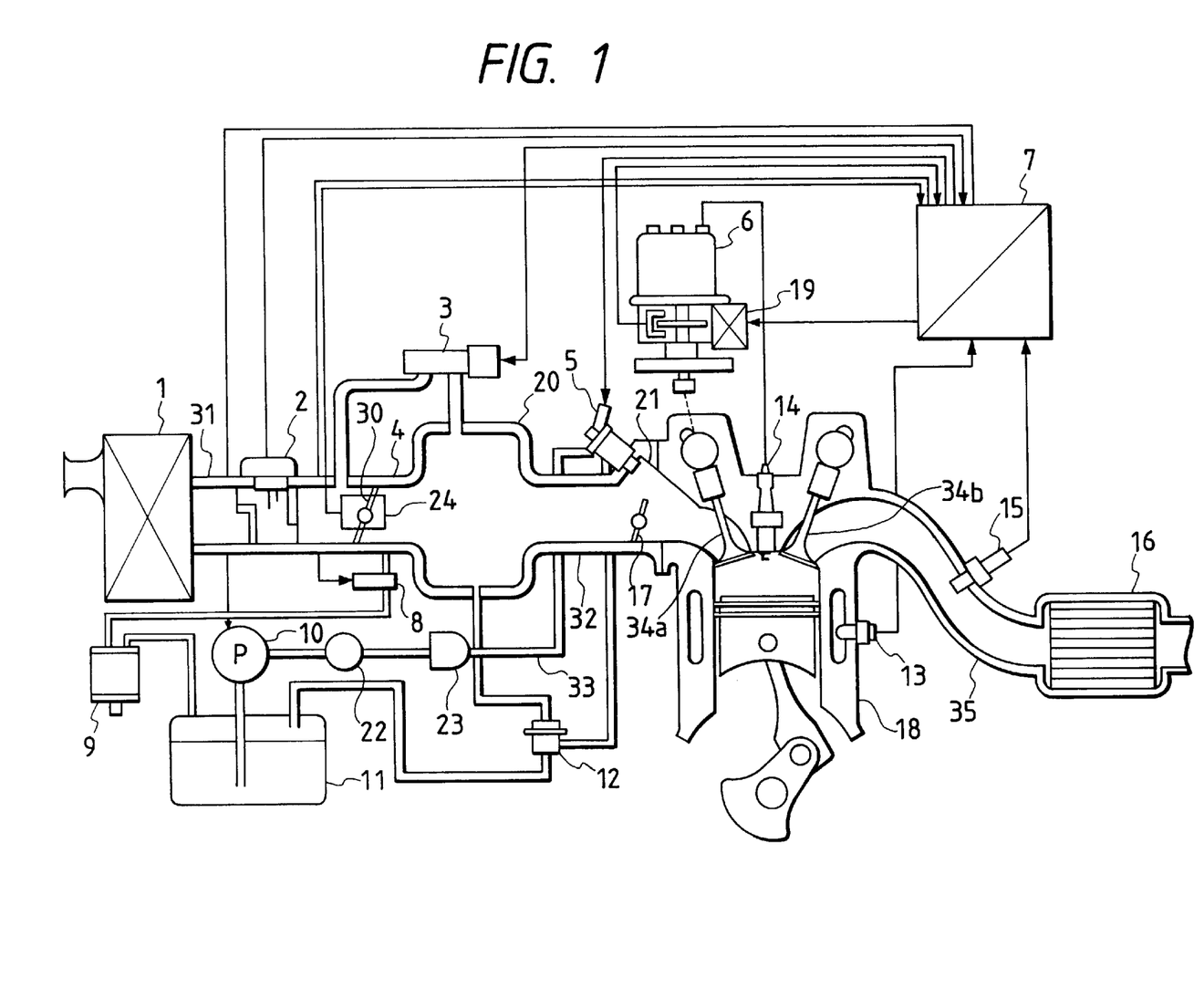
FIG. 1 is a basic schematic diagram illustrating an apparatus for controlling the fuel injection quantity according to the present invention, which is used to an internal combustion engine.
Figure 2:
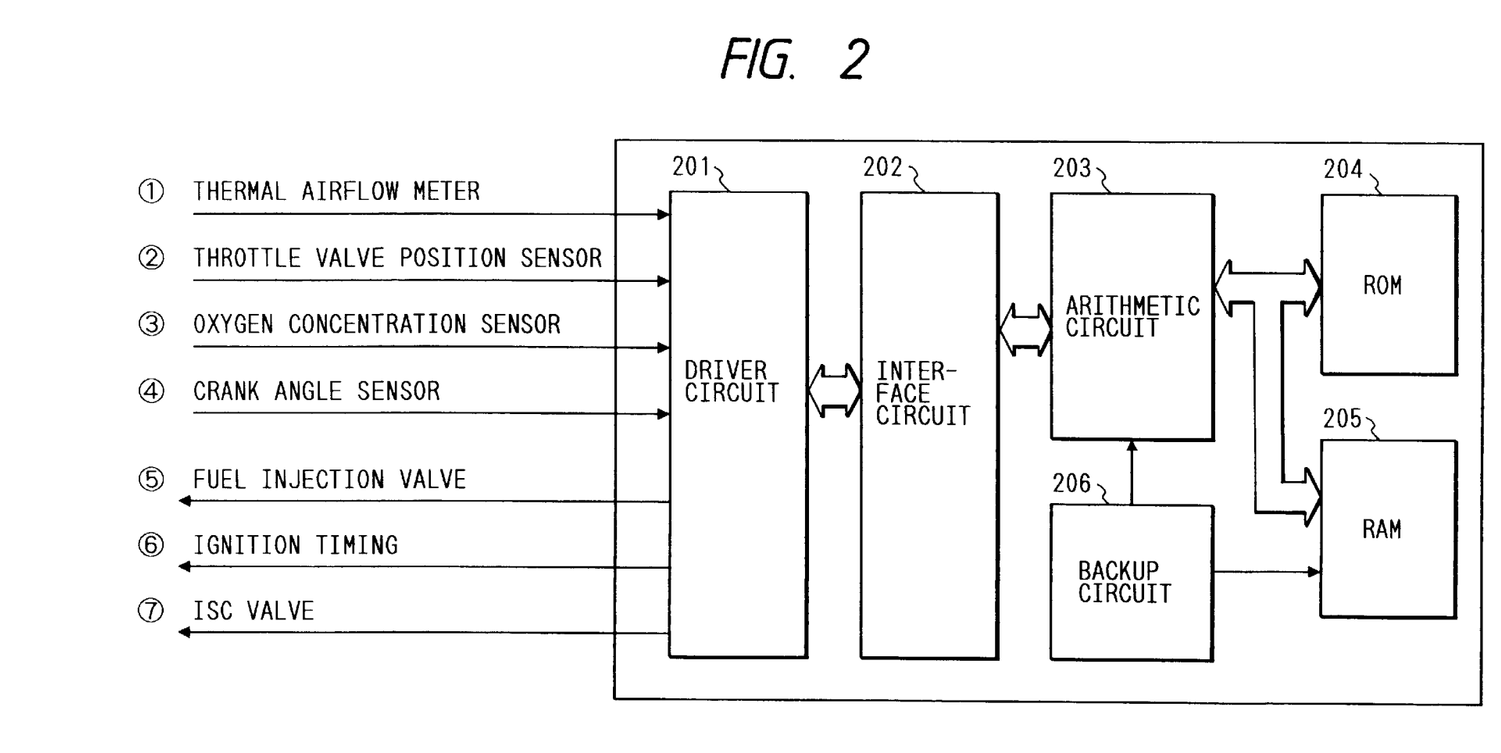
FIG. 2 is a block diagram illustrating an electric circuit used in the apparatus for controlling the fuel injection quantity according to the present invention.

First, the whole construction of an apparatus for controlling the fuel injection quantity according to the present invention will be explained. FIG. 1 shows the whole construction of the apparatus for controlling the fuel injection quantity according to the present invention, which is used to an internal combustion engine. FIG. 2 shows an electric circuit used in the apparatus for controlling the fuel injection quantity according to the present invention, in which input/output signals are illustrated in detail.

Referring to FIG. 1, there is provided an airflow sensor (thermal airflow meter) 2 for detecting the airflow mass or flow rate intaked into an internal combustion engine 18 after being filtered by an air cleaner 1. Air intake passageways (air intake pipes) from the air cleaner 1 are connected, via a duct 31 and a collector 20, to intake pipes, each connected to each of cylinders of the internal combustion engine 18. A throttle body 4 housing a throttle valve 30 for controlling the flow rate to be intaked, is formed in the neighborhood of the connection part between the duct 31 and the collector 20. The duct 31 is provided with an idle speed control (ISC) 3 for controlling the engine idling speed by adjusting the airflow rate by-passing the throttle valve 30. The air to be intaked into the internal combustion engine 18 is intaked from an inlet of the air cleaner 1, through the duct 31 and the airflow sensor 2 and further through the throttle body 4 or the ISC valve 3, into the collector 20. Where, the intake air is distributed into the intake pipes such as a pipe 32 and is induced into the cylinders.

A swirl control valve (SCV) 17 is provided in the intake pipe 32 and at an inlet part of the engine 18, which is opened and closed by a control signal from a control unit 7 mentioned later. Thus, the intake air is swirled and intaked into the cylinder.

A fuel injector (fuel injection valve) 5 provided at an intake port 21 of the intake pipe 32, for injecting the fuel is connected via a piping 33 to a fuel tank 11. In the piping 33, there are provided a fuel pump 10, a fuel damper 22 and a fuel filter 23 for supplying the sucked and pressurized fuel from the fuel tank 11 to the injector 5. In a fuel piping system, there is provided a fuel pressure regulator 12 for adjusting the fuel pressure so that the fuel pressure supplied to the injector 5 may be always maintained constantly.

The control unit 7 receives a signal from the various sensors, executes the predetermined arithmetic processing and controls an amount of fuel to be supplied, an ISC air, an ignition timing and so on. Further, the control unit 7 receives an output signal indicative of an amount of air from the airflow sensor 2 and an output signal indicative of the temperature of cooling water from a water temperature sensor 13. And further, the control unit 7 receives an output signal from a throttle sensor (throttle valve position sensor) 24 provided inside the throttle body 4, for detecting the position (opening) of throttle valve 30.

While, as an ignition assembly, there are provided an ignition coil 19, an ignition plug 14 and a distributor for distributing a high-voltage current to the ignition plug 14. The distributor 6 includes a crank angle sensor (not shown), which outputs a reference signal REF indicative of a rotational position of a crank axle and a position signal POS for detecting a rotational speed (rotational frequency). These signals are inputted into the control unit 7. The ignition plug 14 induces an electric energy with high voltages generated by the ignition coil 19 when an ignition signal from the control unit 7 was provided to it, whereby a fuel mixture intaked through an intake valve 34a into the cylinder is ignited. The exhaust gas is exhausted through a exhaust valve 34b.

A charcoal canister 9 is provided in a piping connecting the fuel tank 11 to the throttle body 4. The charcoal canister adsorbs temporarily the fuel vapour generated in the fuel tank 11, and purges the desired amount of fuel vapor by using a purge valve 8 in accordance with the operating conditions.

An exhaust pipe 35 is provided with a catalyst 16, and an oxygen concentration sensor 15 in the upstream of the catalyst. The oxygen sensor 15 detects whether the actual A/F ratio is richer than the theoretical A/F ratio or leaner, and outputs the resultant signal to the control unit 7.

As shown in FIG. 2, a main part of the control unit 7 comprises a driver circuit 201 for converting low-power signals from the various sensors into high-power signals, respectively, an interface circuit 202 for converting an analog input/output signals into digital signals which are able to execute a digital arithmetic processing, an arithmetic circuit 203 including a microcomputer for executing the digital arithmetic processing or another circuit corresponding to the microcomputer, a non-volatile ROM 204 and a volatile RAM 205 for storing constants, variables and programs used in the arithmetic processing in the arithmetic circuit 203, and a backup circuit 206 for keeping the content of the volatile RAM 205. The control unit 7 shown in FIG. 2 receives output signals derived from the various sensors such as the thermal airflow meter 2, the throttle valve position sensor 24, the oxygen concentration sensor 15 and a crank angle sensor, and executes the predetermined arithmetic processing. The resultant control signals are supplied to the fuel injection valve 5, the ignition coil 19 and the ISC valve 3, whereby the fuel injection, the ignition and the ISC are controlled.

Figure 3:
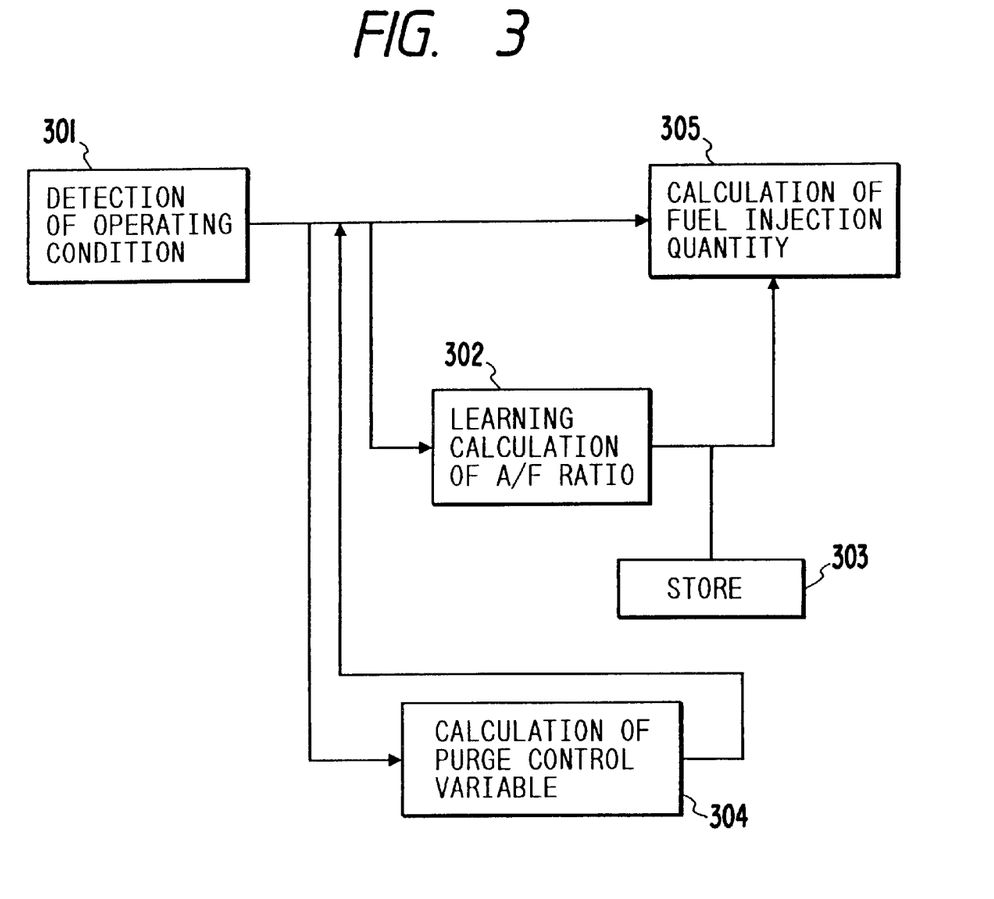
FIG. 3 is a block diagram illustrating the setting of the fuel injection quantity, and illustrating the concept of the apparatus for controlling the fuel injection quantity according to an embodiment of the present invention.

FIG. 3 is a block diagram illustrating the setting of the fuel injection quantity. In block 301, the operating conditions of the internal combustion engine such as a load, the rotational speed, the cooling water temperature and a battery voltage are detected, on the basis of the outputs of sensors for detecting the engine speed, the intake amount or the intake negative pressure, the cooling water temperature and the battery voltage. In block 304, the canister purge amount is calculated on the basis of the operating conditions. In block 302, the effect of disturbance due to the canister purge is inputted and the deviation from the desired A/F control is learned by the A/F feedback control. The deviation is stored in block 303. Finally, in block 305, the fuel injection quantity is calculated by using the correction amount based on the results of the blocks 301 to 304.

Next, the control of the fuel injection quantity will be explained in detail, in which the A/F ratio open control is performed.

Figure 4:
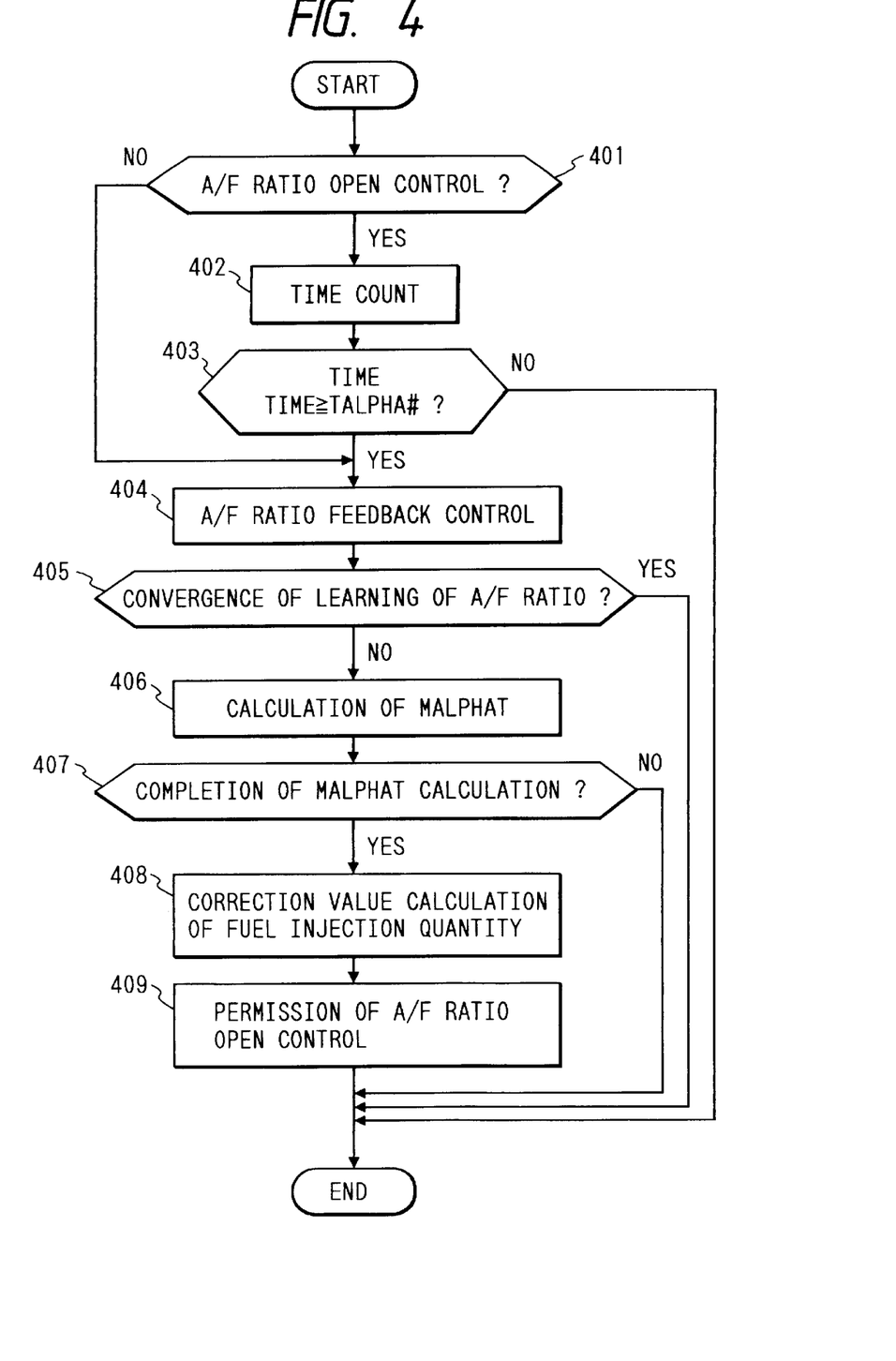
FIG. 4 is a general flow chart illustrating the operation of the fuel injection quantity control.

FIG. 4 is a general flow chart illustrating the operation of the fuel injection quantity control which is performed every predetermined time. First, in step 401, it is determined whether the A/F ratio control is the open control. If it is the A/F ratio open control, the processing shifts to step 402, in which the time TIME is counted, at which the A/F ratio control is during the open control and the disturbance of the A/F ratio may occur, in order to count the time until when it is possible to ignore the effect which the disturbance due to the purge exerts on the A/F ratio. It is possible to fetch sufficiently the effect of the disturbance of A/F ratio by setting the time at which the disturbance of A/F ratio can be sufficiently stabilized as above. Therefore, it is prevented to mistake the effect of disturbance. In step 403, it is determined whether the TIME is larger than the predetermined value TALPHA#, thus whether the effect that the disturbance exerts on the A/F ratio can be ignored. It is appreciated that the value of TALPHA# can be preset to such the value that the disturbance which changes over time during the open control does not exert the bad influence upon the accuracy of A/F ratio open control. If TIME≧TALPHA#, it is determined that it is necessary to check the extent of purge effect to the A/F ratio. The processing shifts to step 404 in which the open control is stopped and the feedback control is started.

Next, it is determined in step 405 whether the learning of A/F ratio converged. This is used when the extent of the effect of disturbance is calculated in step 406, in order to confirm that the center of control is obtained. If the value of learning at each region does not converge, the control of learning is performed in order to obtain the center of control. In step 406, MALPHAT (the average of the coefficient α) representative of the effect of A/F ratio disturbance is calculated. More concretely, the MALPHAT is used in order to detect the effect of disturbance by the difference from the center of control of the coefficient of feedback. It is determined whether the calculation of MALPHAT was completed in step 407, because it takes a long time to calculate the MALPHAT. In step 408, the correction value of fuel injection quantity corresponding to the amount of disturbance is determined, and the A/F ratio open control is started again on the basis of the obtained correction value.

While in the preferred embodiment of the present invention, the time between the execution of open controls has been used in order to overcome the time variation of the A/F ratio disturbance, it should be understood that numerous modifications may be made thereto. For example, instead of the time count, it is possible to use the total sum of engine speed during the open control, the amount of intake air, or the total amount of disturbance control to the A/F ratio control during the open control, and in their case the same performance is obtained.

Figure 5:
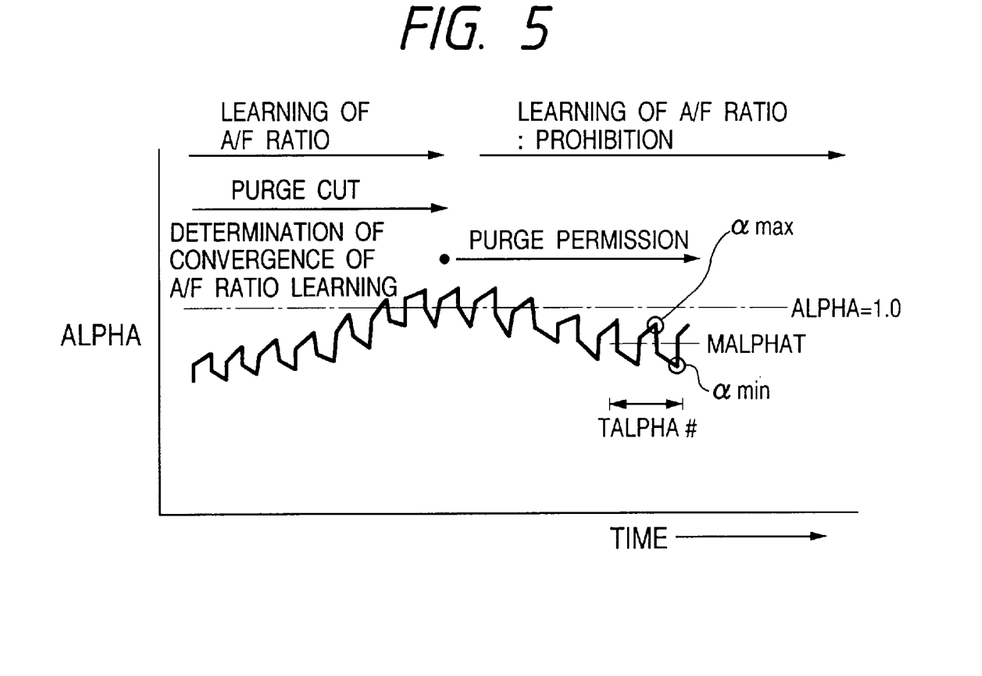
FIG. 5 is a timing chart illustrating the correction of the fuel injection quantity.

FIG. 5 is a timing chart illustrating the correction of the fuel injection quantity. As described above, the learning is performed till ALPHA=1.0, at which the ALPHA representative of the deviation to the desired A/F ratio converges. In a period for learning, the disturbance of A/F ratio control i.e. the canister purge is cut. Whereby the scattering of components and the deviation of the center of control changed according to the environment conditions are compensated and the center of control is keeped. After it is determined that the learning control has converged, the learning control is prohibited, the purge is permitted, and MALPHAT representative of the average of the deviation of A/F ratio is calculated. In the present embodiment, the MALPHAT is obtained from the average at the predetermined portion of the value $\alpha_{max}$ just before the proportional control part (P part) of lean correction is added to ALPHA and the value $\alpha_{min}$ just before the proportional control part (P part) of rich correction is added to ALPHA.

Figure 6:
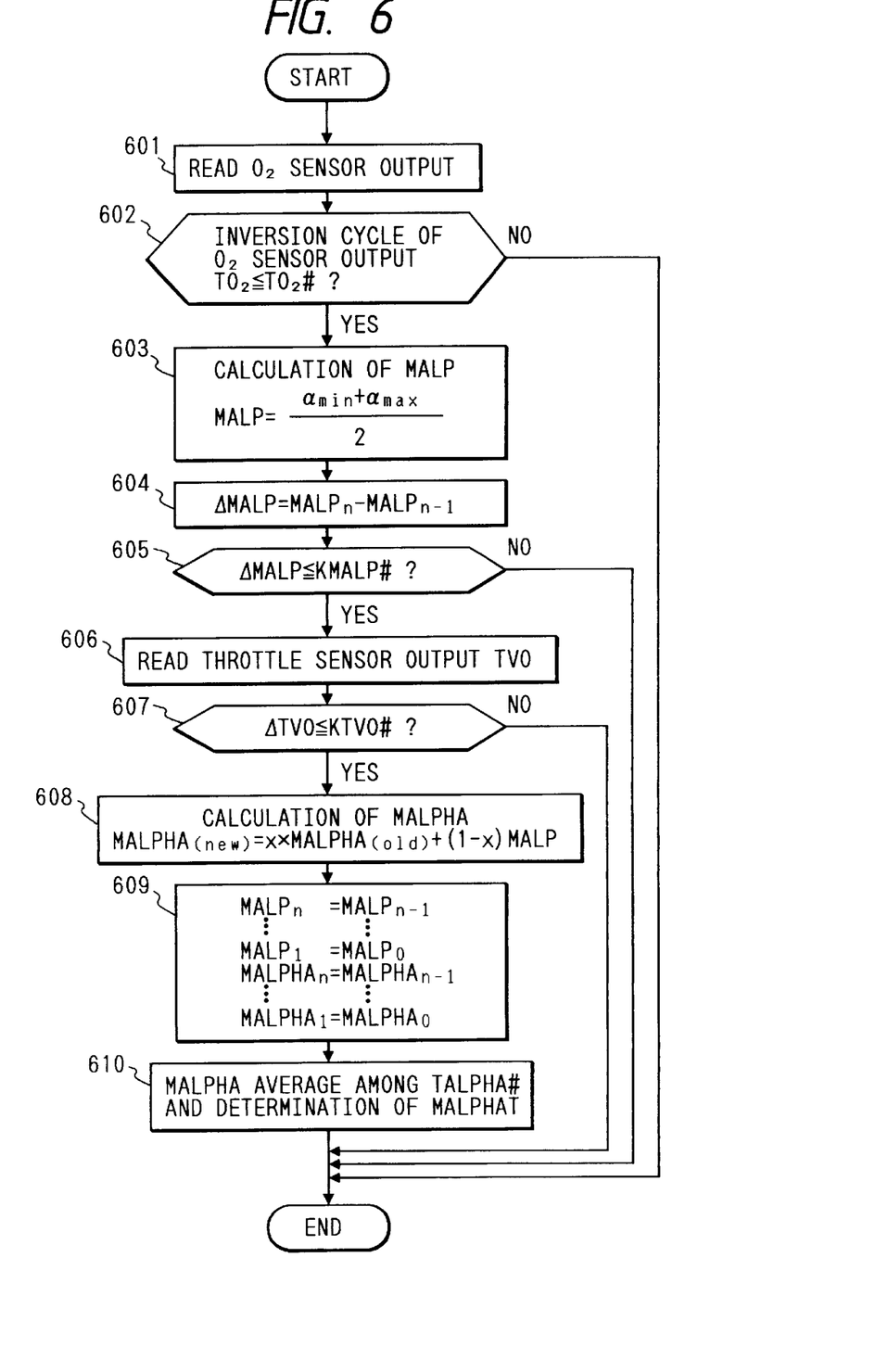
FIG. 6 is a general flow chart illustrating the determination of the correction value of the fuel injection quantity.

Next, FIG. 6 is a general flow chart illustrating the determination of the correction value of the fuel injection quantity. It must be necessary to determine the MALPHAT in such a state that the A/F ratio feedback control is suitable and stable, because it is necessary to obtain accurately the effect of disturbance. Namely, when the oxygen sensor works normally and the operating conditions are in a transitional state, the determination of MALPHAT must be excluded from the flow. As an example of method of determining whether or not the oxygen sensor works normally, there is a method of detecting the inversion cycle (inversional period) of the oxygen sensor during the feedback control. A flow for calculating the MALPHAT by using the method will be explained in detail hereinafter.

In step 601, the output of oxygen sensor is read. it is determined whether the inversion cycle $TO_2$ is equal to or less than the predetermined value $KTO_2\#$ in step 602. It is desired that the $KTO_2\#$ value is substantially equal to the inversion cycle of oxygen sensor in such a condition that the A/F ratio feedback control is performed normally. If the inversion cycle $TO_2$ of oxygen sensor is more than the predetermined value $KTO_2\#$, then it is determined that the A/F ratio feedback control is not suitable, and the calculation is cancelled. In step 603, the average value MALP of the maximum value $\alpha_{max}$ of ALPHA and the minimum value $\alpha_{min}$ is calculated every time when the A/F ratio deviation ALPHA is inverted. When the A/F ratio feedback is not stable, for example, due to the lag of the corollary of disturbance, the value of MALP is liable to vary. Therefore, the relative difference $\Delta$MALP between the current MALP value and the former value is obtained in step 604, in order to detect the effect of disturbance under the stable conditions. In step 605, If $\Delta$MALP$\geq$KMALP#, it is determined that the A/F ratio feedback is not stable, and the flow is closed without shifting to the next step. On the other hand, if it is determined that $\Delta$MALP$\leq$KMALP# in step 604, the processing shifts to step 606 in which the output value TVO of the throttle sensor is read. In step 607, it is determined whether the variation value $\Delta$TVO of TVO per hour is equal to or less than the predetermined value KTVO#. If $\Delta$TVO is more than KTVO# and the operating condition is in the transient state, it is similarly determined that the A/F ratio feedback is not stable, and the flow is closed without shifting to the next step. It should be understood that numerous modifications may be made thereto. For example, instead of the TVO in step 607, it is possible to use the variation of engine speed per hour, the load variation of of the internal combustion engine, and also in their case or in a case in which a plurality of variation are combined, the same performance is obtained.

Next, in step 608, the MALPHA is obtained by using the following equation (1) on the basis of the obtained MALP value.

$$\text{MALPHA}_{(new)} = x \times \text{MALPHA}_{(old)} + (1-x) \times \text{MALP} \quad (1)$$

in the equation (1), a weighting coefficient x is multiplied by the former value of MALPHA, and next (1–x) is multiplied by the resultant MALPHA, because the deviation $\alpha$ may vary complicately and the value of MALPHA also varies according to the value of $\alpha$. By the repetition of the calculation, it becomes possible to obtain the average value of MALPHA, indicative of the extension of the effect of disturbance.

In step 609, the values of MALP and MALPHA are stored the predetermined times in a memory, in order to calculate for equation (1). In step 610, the average value of MALPHA during the predetermined time TALPHA# is obtained in order to increase the reliability of the value of MALPHA representative of the extension of effect of the disturbance. The value of MALPHA is used as the extension of effect of the disturbance of A/F ratio.

By using the following equation (2) as a COEF (multiplied by the fuel injection quantity) when the MAL-PHAT is converted to the fuel injection quantity, the desired A/F ratio is obtained, where $\text{COEF}_{(old)}$ is a coefficient of correction which is not including the correction to the disturbance of A/F ratio.

$$\text{COEF}_{(new)} = \text{COEF}_{(old)} \times \text{MALPHAT} \quad (2)$$

In FIG. 6, the smoothing of variables is performed in steps 608 and 610 in order to obtain the effect of disturbance. However, it is possible to exclude either step. If the A/F ratio feedback of the internal combustion engine is always stable, it is possible to exclude both steps 608 and 610.

Hereinbefore, the example has been explained in which the extension of the disturbance of A/F ratio is equal at each operation region. Another example will be explained hereinafter, which the extension of the disturbance of A/F ratio is different at each operation region.

Figure 7:
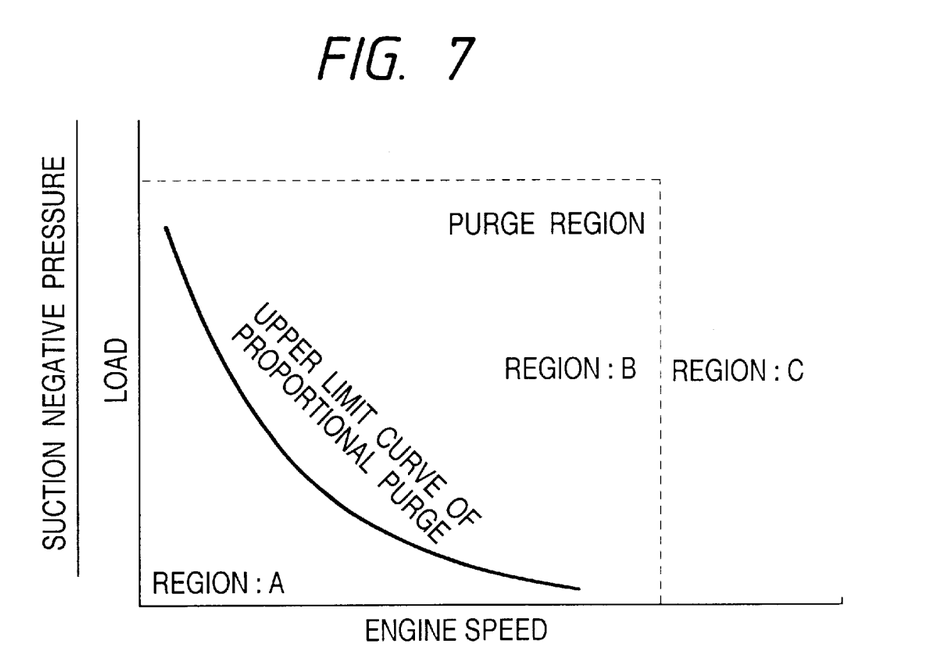
FIG. 7 is a graph showing an example of a canister purge region.

If the extension of the disturbance of A/F ratio is different at each operation region, it is impossible to use the same MALPH value at each operation region. FIG. 7 is a graph showing the extension of effect at each operation region in which a canister purge is picked up as an example of the disturbance of A/F ratio control. The purge factor PARJ is a rate of the purge amount Qp to the intake air amount Qa and is defined by the following equation (3).

$$\text{PARJ} = \text{Qp}/\text{Qa} \quad (3)$$

In FIG. 7, a region A is a purge factor control region where it is possible to control the purge amount Qp in proportion to the intake air amount Qa according to the equation (3), and the control of purge amount is performed by a control means for the variable amount of canister purge. A region B is that where it is impossible to control the purge factor in proportion to the intake air amount Qa, because the Qa reaches the maximum value due to the full open of the purge valve. A region C is that where the purge is not performed.

In the region A, the extension of the effect on the A/F ratio control is the same, it is therefore possible to use the same MALPHA value. In the region C, the purge is not performed, therefore, the value of MALPHA is set to 1.0. It is appreciated that the control under the conditions of canister purge cut is the same as that in the region C.

While, in the region C, it is impossible to increase the intake air amount Qa more than the amount when the purge factor Qp has reached the maximum value. Thus, it is impossible physically to control the purge factor PARJ. When the purge valve is fully open, the purge amount Qp depends on the negative pressure of intake in the engine. Therefore, as the negative pressure of intake becomes close to the atmospheric pressure, the purge factor PARJ decreases.

As described above, the MALPHAT determined at the region A can not be applied to the region B as it is, since the purge factor PARJ in the region B is different from that in the region A. Accordingly, in the case that the extension of effect of the disturbance of A/F ratio is different at each operation region, it is necessary to correct the MALPHAT at each operation region. The correction can be made in the following way. That is, the purge factors PARJ are obtained under the different operating conditions, Then, the variation amount of each of ALPHAs is calculated, which correspond to the obtained purge factors.

Figure 8:
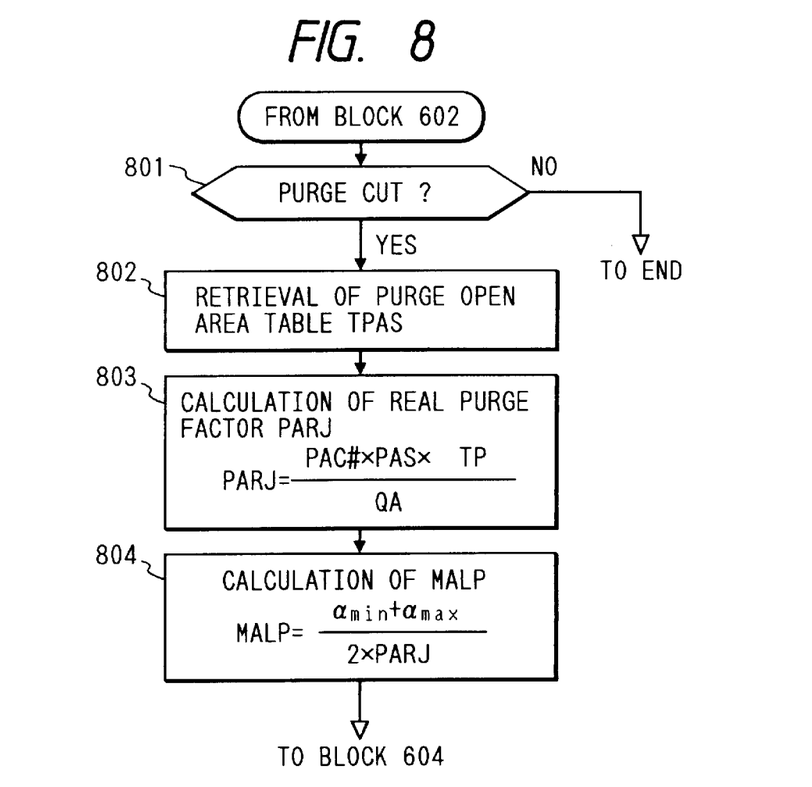
FIG. 8 is a general flow chart illustrating the determination of the correction value of the fuel injection quantity for each operation region.

FIG. 8 is a general flow chart illustrating an example of such the correction method. The flow of FIG. 8 is a modification of the flow shown after the step 603 in FIG. 6. In step 801, it is determined whether the canister purge is being performed. If the purge is cut, then the flow is closed without shifting to the next step. In step 802, the open area PAS of the purge valve is determined, which controls variably the purge amount necessary to obtain the value of the purge factor PARJ at a certain operating condition. The PAS can be obtained by retrieving a table TPAS of the open area of the purge valve corresponding to a drive signal. If the valve open characteristics is changed by the battery voltage or the environmental temperature, the PAS value can be corrected by detecting the battery voltage or the temperature of the cooling water. In step 803, the purge factor PARJ can be calculated by using the following equation (4), on the basis of the value of the obtained PARJ.

$$PARJ = \frac{PAC\# \times PAS \times \sqrt{TP}}{Qa} \qquad (4)$$

where, PAC# is a constant, and TP is indicative of the load of the internal combustion engine.

In the above embodiment, the purge factor has been determined by using the equation (4). However, it should be understood that numerous modifications may be made thereto. For example, the purge factor can be determined by setting a map with an engine speed axis and a load axis, setting constants corresponding to the predetermined purge factors, and retrieving the map, because the purge factor PARJ depends on the engine speed and the load of the engine.

As described above, the effect of purge is different at each operation region. Therefore, in step 804, the average value of the maximum value $\alpha_{max}$ and the minimum value $\alpha_{min}$ (see FIG. 6) is divided by the PARJ, whereby the varied amount of the deviation ALPHA to a unit purge factor is obtained and it becomes possible to determine the correction value of fuel injection quantity corresponding to the purge factor at each operating condition. The step 804 continues to the flow shown after the step 604 in FIG. 6.

Figure 9:
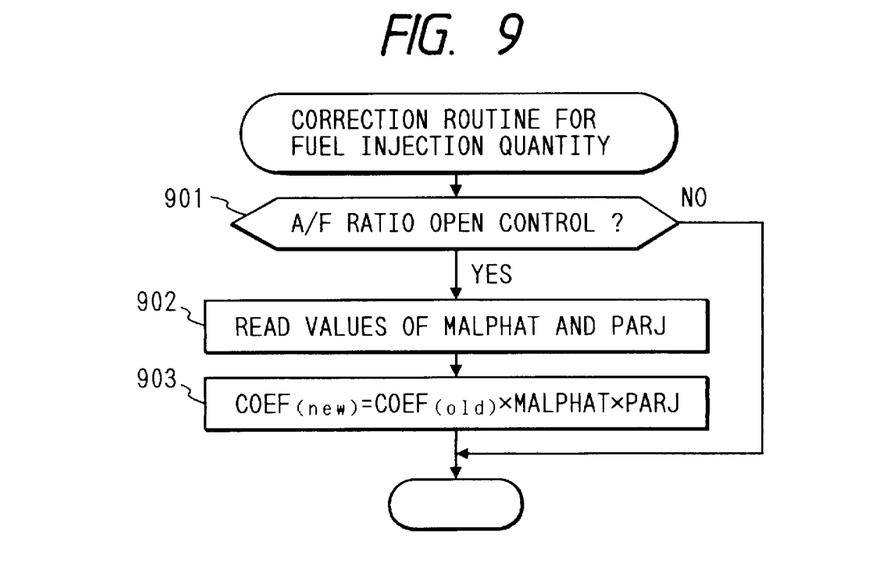
FIG. 9 is a general flow chart illustrating a method of correcting the fuel injection quantity influenced by the disturbance.

Referring to FIG. 9, An example of the method of correcting the fuel injection quantity by using the MALPHAT will be explained hereinafter.

In step 901 of the correction routine for the fuel injection quantity, it is determined whether or not the control is the A/F ratio open control. If not the open control, the flow is closed without shifting to the next step. In step 902, the MALPHAT and the PARJ are read. Then, in step 903, the $COEF_{(new)}$ is calculated by multiplying $COEF_{(old)}$ by the MALPHAT and the PRAJ. The $COEF_{(new)}$ will be used for the fuel injection hereinafter.

Figure 10:
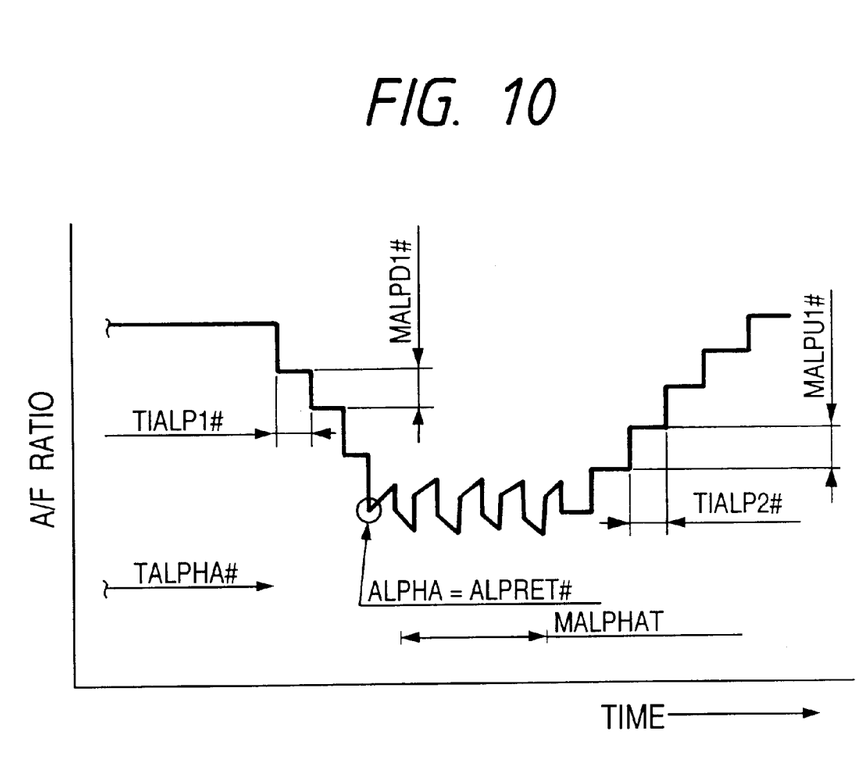
FIG. 10 is a timing chart illustrating a point of time when the A/F ratio control mode is switched.

If the switching from the A/F ratio feedback control to the A/F ratio open control or from the open control to the feedback control exerts the bad effect on the driving characteristic, because of the desired A/F ratios of the feedback control and the open control being different from each other, it is essential to avoid such the control. FIG. 10 is a timing chart illustrating a point of time when the A/F ratio control mode is switched, and shows an example of the method for avoiding such the control. The timing chart of FIG. 10 shows the state after the open control was performed for the TALPHA#. Assumed that the open control is suddenly shifted to the feedback control. A torque difference corresponding to the difference between the A/P ratios occurs, thus exerting the bad effect on the driving characteristic. It is, therefore, necessary gradually to vary the A/F ratio to the desired A/F ratio of feedback control by the predetermined value MALPD1# every the predetermined time TIALP1#. The MALPHA is calculated after the shift to the feedback control, and in order to maintain the driving characteristic after the permission condition for the open control was established again, the correction value of fuel injection quantity is gradually varied by the predetermined value MALPD1# every the predetermined time TIALP1# until the A/F ratio reaches the desired A/F ratio of feedback control.

Figure 11:
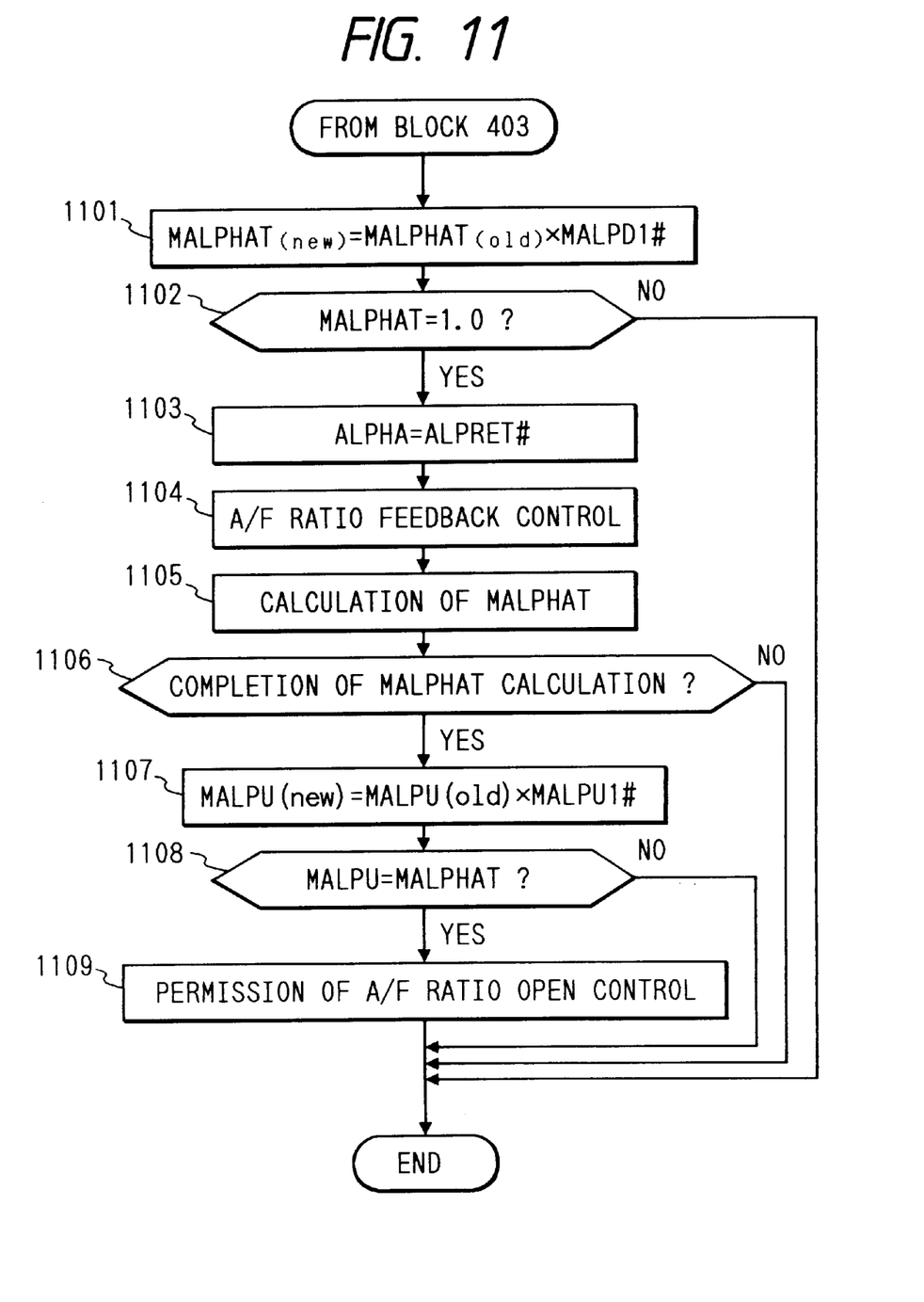
FIG. 11 is a general flow chart illustrating the switching operation of the A/F ratio control.

FIG. 11 is a general flow chart illustrating the switching operation of the A/F ratio control, and shows an example of the method of maintaining the driving performance after switching. The flow of FIG. 11 is inserted between the step 403 of FIG. 4 and the step 404. In step 1101, the effect of disturbance of the control of A/F ratio, MALPHAT, is calculated by using the following equation (5).

$$MALPHAT_{(new)} = MALPHAT_{(old)} \times MALPD1\# \qquad (5)$$

where the value of MALPD1# may be determined by the estimation of driving performance.

In step 1102, it is determined whether the value of MALPHAT=1.0 was cleared. When the value of MALPHAT was cleared, the coefficient of correction for the deviation of A/F ratio, ALPHA($\alpha$) is returned to the value equal to the ALPRET#. It should be noted that the extension of the effect of the disturbance of A/F ratio may be different from that just before the feedback control is shifted to the open control. The value of ALPRET# can be obtained by experiments. In step 1104, The A/F ratio control is returned to the feedback control. The processing shifts to step 1105 in which the MALPHAT is calculated again. In step 1106, the completion of the calculation of MALPHAT is determined. In step 1107, when the condition of shift to the open control is established, the effect of the disturbance of the control of A/F ratio, MALPU, is calculated by using the following equation (6).

$$MALPU_{(new)} = MALPU_{(old)} \times MALPU1\# \qquad (6)$$

where the value of MALPU1# may be determined from the estimation of driving performance by experiments. In step 1108, the equation (6) is calculated until the value of MALPU reaches the value of MALPHAT obtained in the step 1106. Whereby the active A/F ratio during the open control can be controlled to the desired value. In step 1109, the A/F ratio open control is permitted on the basis of the correction value of fuel injection quantity obtained above.

While the correction value of fuel injection quantity has been gradually varied when the feedback control is switched to the open control, it should be understood that numerous modifications may be made thereto. For example, it is possible to vary the ignition timing. The ignition timing is temporarily allowed to be delayed, and then is allowed gradually to be returned to the optimum ignition timing (MBT). Further, the same performance is achieved by an air amount control by a supplemental air control valve. If the output torque increases by the switching of A/F ratio control, the supplemental air amount is decreased according to the amount of the variation of torque. If the output torque decreases, the supplemental air amount is increased according to the amount of the variation of torque.

Figure 12:
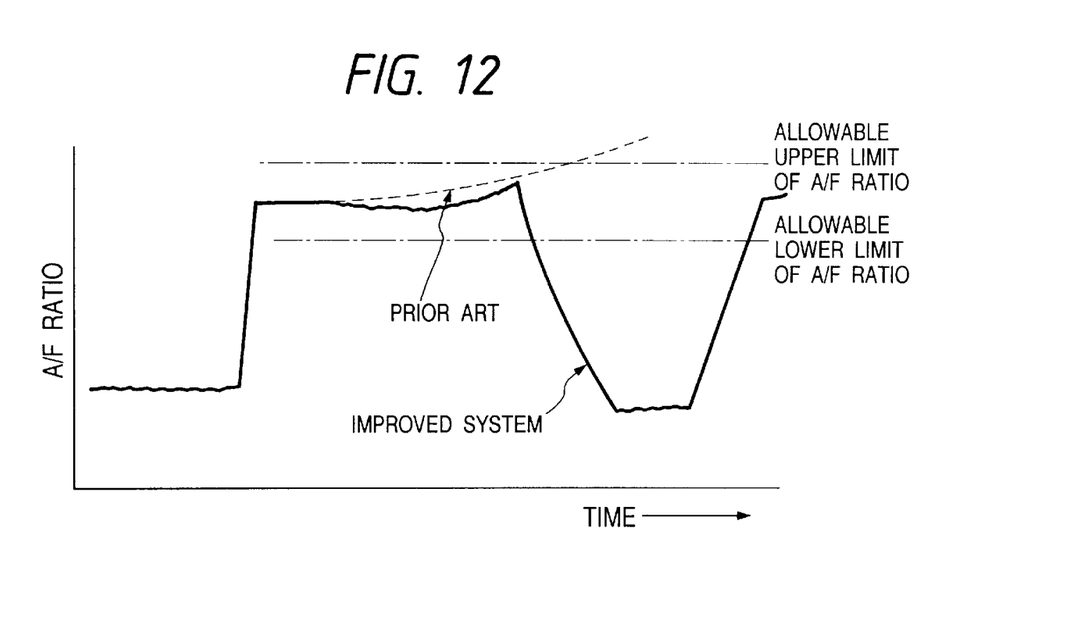
FIG. 12 is a timing chart illustrating an example of effects of the correction of the fuel injection quantity.
Figure 13:
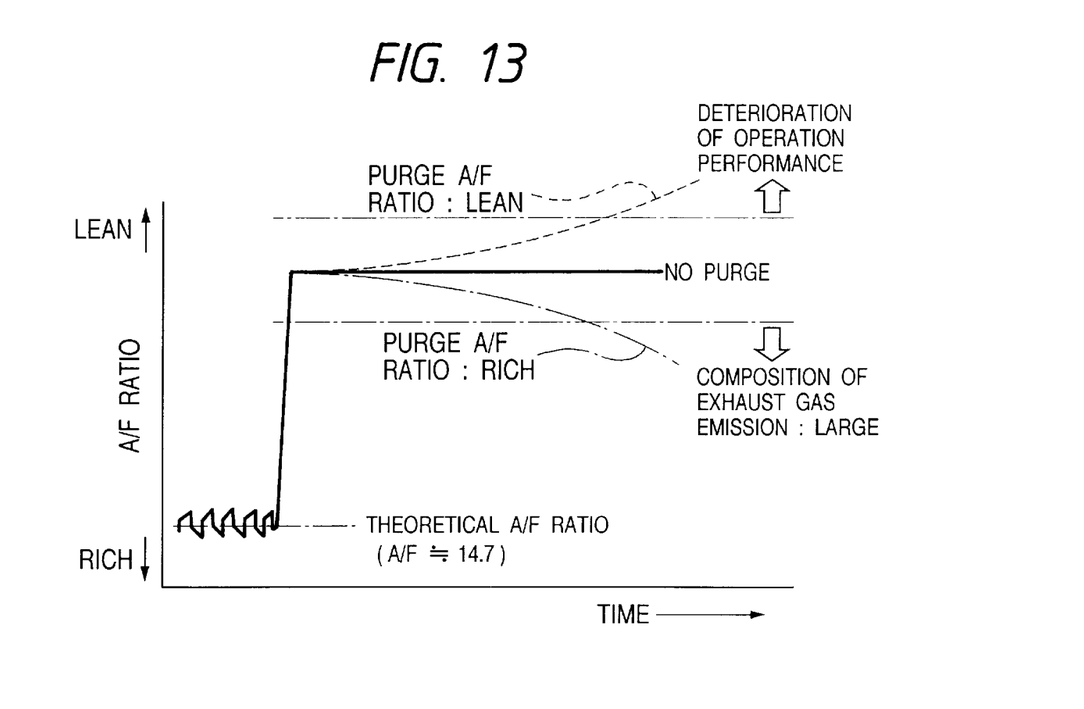
FIG. 13 is a timing chart illustrating an example of the prior art A/F ratio open control performed in the internal combustion engine.

FIG. 12 is a timing chart illustrating an example of effects of the correction of the fuel injection quantity, and shows the result when the factor of disturbance of A/F ratio is caused to become lean after the A/F ratio open control is started. In the prior system, the A/F ratio becomes more than the allowable upper limit (ex. the output A/F=25.0) after a certain time lapsed, and become overlean. On the other hand, while the A/F ratio becomes lean after a certain time lapsed in the present invention, the feedback control is started before the A/F ratio becomes more than the allowable upper limit, and the open control is started again after the recognition of the effect of disturbance. It should be noted that the value of A/F ratio is within the predetermined value. Accordingly, the present invention can provide the apparatus for controlling the fuel injection quantity for the internal combustion engine which is capable of more effectively lowering emission levels in order to meet current and future low emission vehicle and its regulations.

We claim:

1. An apparatus for controlling fuel quantity to be injected by an injector into an internal combustion engine, comprising:

first means, including an oxygen sensor, for detecting an actual A/F ratio;

second means for detecting at least one of an intake air amount and an internal pressure of an intake pipe in the internal combustion engine;

third means for producing a value indicative of a deviation of the actual A/F ratio from a target value of the A/F ratio;

fourth means for discriminating the operating conditions of the internal combustion engine on the basis of an engine speed and an output of the second means;

fifth means for determining the quantity of fuel to be injected by the injector on the basis of the operating conditions discriminated by the fourth means;

sixth means for identifying the amount of canister purge from the operating conditions discriminated by the fourth means;

seventh means having a map, in which plural memory areas are defined by the engine speed and the output of the second means, and storing the value of deviation obtained by the third means in a memory area corresponding to the operating conditions discriminated by the fourth means;

eighth means for determining an appropriate A/F ratio for respective regions of the operating conditions of the engine, taking account of the amount of canister purge identified by the sixth means; and ninth means for correcting the fuel quantity to be injected by the injector on the basis of outputs of the third and the seventh means, wherein the third means include: means for calculating an inversion cycle of an output from said oxygen sensor, and for storing said calculated inversion cycle at a storing area every time said output from said oxygen sensor is inverted; means for calculating an average value of the deviation from the target A/F ratio obtained from an output value of said oxygen sensor every time a correction value of the deviation is inverted; and means for calculating the variation of the average value of the deviation from said target A/F ratio, and for storing the calculated variation in said storing area.

2. An apparatus for controlling the fuel injection quantity according to claim 1, wherein said ninth means corrects the quantity of fuel to be injected by the injector by using a correction value of the quantity of fuel to be injected obtained on the basis of said average value of the deviation from the target A/F ratio.

3. An apparatus for controlling the fuel injection quantity according to claim 1, further comprising means for shifting from A/F ratio open control to A/F ratio feedback control on the basis of at least one parameter of a period of time, a total intake air amount and a sum of engine speeds during said A/F ratio open control, and a total control amount of the disturbance of the A/F ratio control.

4. An apparatus for controlling the fuel injection quantity according to claim 3, wherein said total control amount of the disturbance of the A/F ratio control is substantially equal to the total purge amount of the canister purge.

5. An apparatus for controlling the fuel injection quantity according to claim 3, wherein the switching between the A/F open control and the A/F feedback control is performed by the fuel injection amount correcting means.

6. An apparatus for controlling an amount of fuel to be injected into an internal combustion engine, comprising:

a fuel injection valve for supplying the amount of fuel to the engine in response to a fuel injection signal given;

a first sensor for detecting at least one of an amount of air sucked into the engine and internal pressure in an intake pipe of the engine;

a second sensor for detecting a rotational speed of the engine, an output of which is used together with an output of the first sensor to calculate a signal of a basic fuel injection amount;

a third sensor for detecting an A/F ratio of an air/fuel mixture supplied to the engine, an output of which is fed back to produce a correction coefficient ($\alpha$) for correcting the signal of the basic fuel injection amount so that the A/F ratio of the mixture follows a desired value thereof; and a microprocessor, which selectively executes a feedback control of the A/F ratio and an open-loop control thereof in accordance with an operating condition required of the engine, wherein the microprocessor further executes the following steps at a constant interval during the open-loop control of the A/F ratio:

discriminating whether or not a control disturbance detected from the output of the third sensor exceeds a predetermined level;

interrupting the open-loop control of the A/F ratio to shift to the feed-back control thereof, if the disturbance exceeds the predetermined level, and if not, quitting the processing, retrieving whether or not a learning control of the correction coefficient ($\alpha$) is already done with respect to the A/F ratio detected;

executing a learning control that the degree of influence of the disturbance on the correction coefficient ($\alpha$) is calculated and stored, if the learning control is not yet done, and if already done, quitting the processing;

amending the correction coefficient ($\alpha$) according to the calculated degree of the influence; and correcting the signal of the basic fuel injection amount by the amended correction coefficient to produce the fuel injection signal applied to the fuel injection valve.

* * * * *